United States Patent Office.

OLIVER E. HUNTER, OF KEY PORT, NEW JERSEY, ASSIGNOR TO ADELINE M. JENKINS, ADMINISTRATRIX, AND HENRY M. JENKINS AND JAMES W. BARRETT, ADMINISTRATORS OF THOMAS H. JENKINS, DECEASED, ALL OF NEW YORK CITY.

Letters Patent No. 101,624, dated April 5, 1870.

IMPROVEMENT IN THE MANUFACTURE OF STEEL.

The Schedule referred to in these Letters Patent and making part of the same.

*To all whom it may concern.*

Be it known that I, OLIVER E. HUNTER, of Key Port, Monmouth county and State of New Jersey, have invented a new and useful Process for Making Steel, of which the following is a full, clear, and exact description.

My said invention relates to the manufacture or steel, and consists in purifying and granulating crude cast-iron by pouring it, while in the molten state, in a liquid bath, and then in admixture with fragments of wrought iron, melting it in pots or crucibles.

I take crude iron, whether obtained directly from the smelting of the ore or from the melting of pigs, and while it is in the molten state I pour it into a vessel containing a solution of sulphate of iron (usually called copperas) in water, in the proportion of about a quarter of a pound to a barrel of water. I prefer to use copperas, that being the the best, although about half a pound of alum, or a quarter of a pound of borax or of blue vitriol may be substituted for the quarter of a pound of sulphate of iron, and, in fact, I have obtained good results from the use of water alone, but as I have obtained the best results with the solution of copperas I give that in preference.

The iron, when poured in the liquid, is reduced to small fragments, and these fragments thus obtained are mixed with fragments of wrought iron in the proportion of about from five to twelve per centum of the granulated crude iron, and I then melt the mixture in pots or crucibles, in the same manner as heretofore practiced in making steel. In this way I am enabled to obtain good steel in a cheap and expeditious manner.

I have above mentioned the use of the granulated cast-iron in the proportion of about from five to twelve per centum, because I have found by trial that the lowest percentage named will produce steel of the lowest grade, and the largest proportion named will produce steel of the highest grade, and hence the percentage used must be varied in proportion to the grade of steel desired to be produced.

And, although I have above specified a range of proportions, I do not wish to be understood as limiting my claim of invention thereto.

What I claim as my invention, and desire to secure by Letters Patent in the manufacture of steel, is—

The process of purifying and granulating crude cast-iron by pouring it, while in the molten state, in a liquid bath, substantially as specified, and then melting it in admixture with wrought iron in pots or crucibles, substantially as and for the purpose described.

OLIVER E. HUNTER.

Witnesses:
ANDREW J. DELACY,
H. M. JENKINS.